United States Patent
DeLuca

(10) Patent No.: US 11,086,887 B2
(45) Date of Patent: *Aug. 10, 2021

(54) PROVIDING SEARCH RESULTS BASED ON NATURAL LANGUAGE CLASSIFICATION CONFIDENCE INFORMATION

(71) Applicant: INTERNATIONAL BUSINESS MACHINES CORPORATION, Armonk, NY (US)

(72) Inventor: Lisa Seacat DeLuca, Baltimore, MD (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 224 days.

This patent is subject to a terminal disclaimer.

(21) Appl. No.: 16/295,761

(22) Filed: Mar. 7, 2019

(65) Prior Publication Data

US 2019/0205308 A1 Jul. 4, 2019

Related U.S. Application Data

(63) Continuation of application No. 15/281,529, filed on Sep. 30, 2016, now Pat. No. 10,268,734.

(51) Int. Cl.
*G06F 16/2457* (2019.01)
*G06F 16/242* (2019.01)
(Continued)

(52) U.S. Cl.
CPC ...... *G06F 16/24578* (2019.01); *G06F 16/243* (2019.01); *G06F 16/285* (2019.01); *G06F 16/9535* (2019.01)

(58) Field of Classification Search
CPC ............. G06F 16/24578; G06F 16/243; G06F 16/285; G06F 16/9535
(Continued)

(56) References Cited

U.S. PATENT DOCUMENTS

| 5,713,020 A | 1/1998 | Reiter et al. |
| 5,794,050 A | 8/1998 | Dahlgren et al. |

(Continued)

FOREIGN PATENT DOCUMENTS

| CA | 2757926 A1 * | 10/2010 | ........... G06F 16/353 |
| KR | 20040041256 A * | 5/2004 | ........... G06F 16/353 |

OTHER PUBLICATIONS

Hernandez et al., "A Simple Model for Classifying Web Queries by User Intent," 2nd Spanish Conference on Information Retrieval (CERI—2012), Jan. 2012, pp. 235-240. (Year: 2012).*

(Continued)

*Primary Examiner* — Phuong Thao Cao

(74) *Attorney, Agent, or Firm* — Stephanie Carusillo; Andrew D. Wright; Roberts Calderon Safran & Cole, P.C.

(57) ABSTRACT

A computer-implemented method includes: receiving, by a computing device, a search query from a client device; obtaining, by the computing device, classification and confidence information by applying natural language classification to the search query; generating, by the computing device, search results based on the classification and confidence information, wherein a ratio of the search results is based on the classification and confidence information; and providing, by the computing device, the search results to the client device.

20 Claims, 8 Drawing Sheets

(51) Int. Cl.
*G06F 16/28* (2019.01)
*G06F 16/9535* (2019.01)

(58) Field of Classification Search
USPC .......................................................... 707/731
See application file for complete search history.

(56) References Cited

U.S. PATENT DOCUMENTS

| | | | |
|---|---|---|---|
| 6,757,692 B1* | 6/2004 | Davis | G06F 16/36 |
| | | | 707/692 |
| 6,785,671 B1 | 8/2004 | Bailey et al. | |
| 6,963,867 B2 | 11/2005 | Ford et al. | |
| 7,562,069 B1 | 7/2009 | Chowdhury et al. | |
| 7,606,714 B2 | 10/2009 | Williams et al. | |
| 7,668,812 B1 | 2/2010 | Riley et al. | |
| 7,877,404 B2 | 1/2011 | Achan et al. | |
| 8,086,631 B2 | 12/2011 | Gollapudi et al. | |
| 8,250,080 B1 | 8/2012 | Guha et al. | |
| 8,407,214 B2 | 3/2013 | Li et al. | |
| 8,458,213 B2 | 6/2013 | Edmonds et al. | |
| 8,468,143 B1 | 6/2013 | Oztekin et al. | |
| 8,527,473 B1 | 9/2013 | Brown et al. | |
| 8,612,432 B2 | 12/2013 | Kenthapadi et al. | |
| 8,620,951 B1 | 12/2013 | He et al. | |
| 8,719,249 B2 | 5/2014 | Bennett et al. | |
| 8,756,218 B1* | 6/2014 | Spilsbury | G06F 16/951 |
| | | | 707/713 |
| 8,782,069 B2 | 7/2014 | Jockish et al. | |
| 8,849,804 B1* | 9/2014 | Law | G06F 16/9535 |
| | | | 707/722 |
| 8,954,429 B2 | 2/2015 | Agrawal et al. | |
| 9,229,974 B1 | 1/2016 | Lee et al. | |
| 9,754,036 B1* | 9/2017 | Gabrilovich | G06F 16/9535 |
| 9,754,037 B2 | 9/2017 | Ayan et al. | |
| 10,691,702 B1* | 6/2020 | Fujiki | G06F 16/9038 |
| 2003/0195877 A1 | 10/2003 | Ford et al. | |
| 2003/0212669 A1 | 11/2003 | Dedhia et al. | |
| 2004/0148170 A1* | 7/2004 | Acero | G06F 40/216 |
| | | | 704/257 |
| 2004/0220907 A1 | 11/2004 | Camarillo | |
| 2004/0260534 A1 | 12/2004 | Pak et al. | |
| 2005/0080780 A1* | 4/2005 | Colledge | G06F 16/951 |
| 2005/0131872 A1 | 6/2005 | Calbucci et al. | |
| 2005/0187913 A1 | 8/2005 | Nelken et al. | |
| 2006/0047614 A1* | 3/2006 | Cohen | G06K 9/6277 |
| | | | 706/46 |
| 2006/0143159 A1 | 6/2006 | Chowdhury et al. | |
| 2006/0155693 A1 | 7/2006 | Chowdhury et al. | |
| 2007/0136251 A1* | 6/2007 | Colledge | G06F 16/3338 |
| 2007/0208570 A1* | 9/2007 | Bhardwaj | H04M 3/51 |
| | | | 704/270.1 |
| 2007/0240217 A1 | 10/2007 | Tuvell et al. | |
| 2008/0082518 A1 | 4/2008 | Loftesness | |
| 2008/0097955 A1* | 4/2008 | Kapur | G06Q 30/02 |
| 2008/0172362 A1 | 7/2008 | Shacham et al. | |
| 2008/0172374 A1 | 7/2008 | Wolosin et al. | |
| 2008/0201219 A1 | 8/2008 | Broder et al. | |
| 2008/0215557 A1* | 9/2008 | Ramer | G06F 16/68 |
| 2008/0228724 A1 | 9/2008 | Huang et al. | |
| 2008/0313142 A1 | 12/2008 | Wang et al. | |
| 2009/0006345 A1 | 1/2009 | Platt et al. | |
| 2009/0094223 A1* | 4/2009 | Berk | G06F 16/951 |
| 2009/0157640 A1 | 6/2009 | Signorini et al. | |
| 2009/0177648 A1 | 7/2009 | Bond et al. | |
| 2009/0228353 A1* | 9/2009 | Achan | G06F 16/3326 |
| | | | 705/14.53 |
| 2010/0010958 A1 | 1/2010 | Perrow et al. | |
| 2010/0023331 A1 | 1/2010 | Duta et al. | |
| 2010/0114933 A1 | 5/2010 | Murdock et al. | |
| 2010/0153388 A1 | 6/2010 | Gollapudi et al. | |
| 2010/0257171 A1 | 10/2010 | Shekhawat | |
| 2010/0262495 A1 | 10/2010 | Dumon et al. | |
| 2010/0262615 A1 | 10/2010 | Oztekin et al. | |
| 2010/0293174 A1 | 11/2010 | Bennett et al. | |
| 2010/0299290 A1* | 11/2010 | Chowdhury | G06F 16/353 |
| | | | 706/12 |
| 2010/0299343 A1 | 11/2010 | Ahari et al. | |
| 2011/0029541 A1 | 2/2011 | Schulman | |
| 2011/0078127 A1 | 3/2011 | Lin et al. | |
| 2011/0125791 A1 | 5/2011 | Konig et al. | |
| 2011/0270819 A1* | 11/2011 | Shen | G06F 16/9535 |
| | | | 707/707 |
| 2011/0314012 A1 | 12/2011 | Kenthapadi et al. | |
| 2012/0130967 A1 | 5/2012 | Ni et al. | |
| 2012/0150846 A1 | 6/2012 | Suresh et al. | |
| 2012/0158685 A1 | 6/2012 | White et al. | |
| 2013/0006952 A1* | 1/2013 | Wong | G06F 16/9535 |
| | | | 707/706 |
| 2013/0007605 A1 | 1/2013 | Mihail-Cristian et al. | |
| 2013/0054569 A1 | 2/2013 | Mo et al. | |
| 2013/0091131 A1 | 4/2013 | Szymanski et al. | |
| 2013/0262430 A1* | 10/2013 | Thazhathekalam | G06F 16/58 |
| | | | 707/711 |
| 2013/0325840 A1 | 12/2013 | Kritt et al. | |
| 2014/0172821 A1 | 6/2014 | Hu et al. | |
| 2014/0214814 A1 | 7/2014 | Sankar et al. | |
| 2014/0214895 A1 | 7/2014 | Higgins et al. | |
| 2014/0236579 A1 | 8/2014 | Kurz | |
| 2014/0244610 A1* | 8/2014 | Raman | G06F 16/951 |
| | | | 707/706 |
| 2014/0278556 A1 | 9/2014 | Goltra et al. | |
| 2014/0297613 A1* | 10/2014 | Kasterstein | G06F 16/9535 |
| | | | 707/706 |
| 2014/0344114 A1 | 11/2014 | Sriram et al. | |
| 2014/0372349 A1 | 12/2014 | Driscoll | |
| 2015/0081279 A1 | 3/2015 | Suleman et al. | |
| 2015/0081662 A1 | 3/2015 | Salaka et al. | |
| 2015/0161256 A1 | 6/2015 | Jeh | |
| 2015/0186953 A1* | 7/2015 | Gross | G06T 1/0007 |
| | | | 705/14.58 |
| 2015/0269156 A1 | 9/2015 | Awadallah et al. | |
| 2015/0286643 A1 | 10/2015 | Kumar et al. | |
| 2015/0319224 A1* | 11/2015 | Rong | G06Q 30/02 |
| | | | 709/217 |
| 2015/0370787 A1 | 12/2015 | Akbacak et al. | |
| 2016/0078106 A1* | 3/2016 | Kennewick, Sr. | G06F 16/9038 |
| | | | 707/706 |
| 2016/0085800 A1 | 3/2016 | Pujari | |
| 2016/0092775 A1 | 3/2016 | Lakshmanan et al. | |
| 2016/0148612 A1 | 5/2016 | Guo et al. | |
| 2017/0061330 A1* | 3/2017 | Kurata | G06N 3/084 |
| 2017/0068720 A1 | 3/2017 | Ko et al. | |
| 2017/0193095 A1* | 7/2017 | Ben-Tzur | G06F 40/253 |
| 2017/0193115 A1 | 7/2017 | Wan | |
| 2017/0249309 A1* | 8/2017 | Sarikaya | G06F 40/35 |
| 2017/0364576 A1* | 12/2017 | Chesla | G06F 16/285 |
| 2018/0060326 A1 | 3/2018 | Kuo et al. | |
| 2018/0095964 A1 | 4/2018 | DeLuca | |

OTHER PUBLICATIONS

Bhatia et al., "Analysis and Automatic Classification of Web Search Queries for Diversification Requirements", In Proceedings of the American Society for Information Science and Technology (ASIST 2012), 10 pages, 2012.
Kang et al., "Query Type Classification for Web Document Retrieval", In Proceedings of the 26th Annual International ACM SIGIR Conference on Research and Development in Information Retrieval, pp. 64-71, 2003.
Hakkani-Tur et al., "Translating Natural Language Utterances to Search Queries for SLU Domain Detection Using Query Click Logs", In Proceedings of ICASSP 2012, pp. 4953-4956, 2012.
Mell et al., "The NIST Definition of Cloud Computing", NIST, Special Publication 800-145, Sep. 2011, 7 pages.
Watson Developer Cloud, https://www.ibm.com/watson/developercloud/doc/nl-classifier/, Accessed Sep. 29, 2016; 3 pages.
Watson Developer Cloud, http://natural-language-classifier-demo.mybluemix.neU?,.cm_mc_uid=32433074101514565014745&cm_mc_sid_50200000=1470755507, ccessed Sep. 29, 2016; 2 pages.

(56) References Cited

OTHER PUBLICATIONS

List of IBM Patents or Patent Applications Treated as Related', dated Mar. 7, 2019, 1 page.

\* cited by examiner

PROVIDING SEARCH RESULTS BASED ON NATURAL LANGUAGE CLASSIFICATION CONFIDENCE INFORMATION

BACKGROUND

The present invention generally relates to providing search results to a search query and, more particularly, to providing search results based on natural language classification and confidence information.

Natural language classification (NLC) is a computer-based software technique for classifying input text (e.g., phrases) with confidence levels indicating a confidence that the input text relates to a particular subject or classification. For example, an NLC may classify input text with the phrase "What is the temperature today?" as "Weather" with a relatively high confidence (e.g., indicating that the input text most likely relates to the subject of "Weather"). NLCs may utilize Cognitive Adapters which may provide guidance on how certain words, phrases, sentences, questions, etc. should be classified.

SUMMARY

In an aspect of the invention, a computer-implemented method includes: receiving, by a computing device, a search query from a client device; obtaining, by the computing device, classification and confidence information by applying natural language classification to the search query; generating, by the computing device, search results based on the classification and confidence information, wherein a ratio of the search results is based on the classification and confidence information; and providing, by the computing device, the search results to the client device.

In an aspect of the invention, there is a computer program product for generating search results based on classification and confidence information. The computer program product includes a computer readable storage medium having program instructions embodied therewith, the program instructions executable by a computing device to cause the computing device to: receive a search query from a client device; obtain classification and confidence information, the obtaining comprises: providing the search query to a natural language classification server to direct the natural language classification server to apply the natural language classification to the search query and generate the classification and confidence information on behalf of the computing device, and receiving the classification and confidence information from the natural language classification server, where the classification relates to a subject or intent of the search query and the confidence relates to a likelihood that the search query related to the subject or intent; generate search results based on the classification and confidence information, wherein a ratio of the search results is based on the classification and confidence information; and provide the search results to the client device.

In an aspect of the invention, a system includes: a CPU, a computer readable memory and a computer readable storage medium associated with a computing device; program instructions to receive a search query from a client device; program instructions to provide the search query to a natural language classification server to direct the natural language classification server to apply the natural language classification to the search query and generate classification and confidence information based on receiving the search query, where the classification relates to a subject or intent of the search query and the confidence relates to a likelihood that the search query related to the subject or intent; program instructions to receive the classification and confidence information from the natural language classification server; program instructions to generate an initial set of search results based on the search query; program instructions to filter the initial set of search results based on the classification and confidence information, wherein a ratio of the filtered search results is based on the classification and confidence information; and program instructions to provide the filtered search results to the client device. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
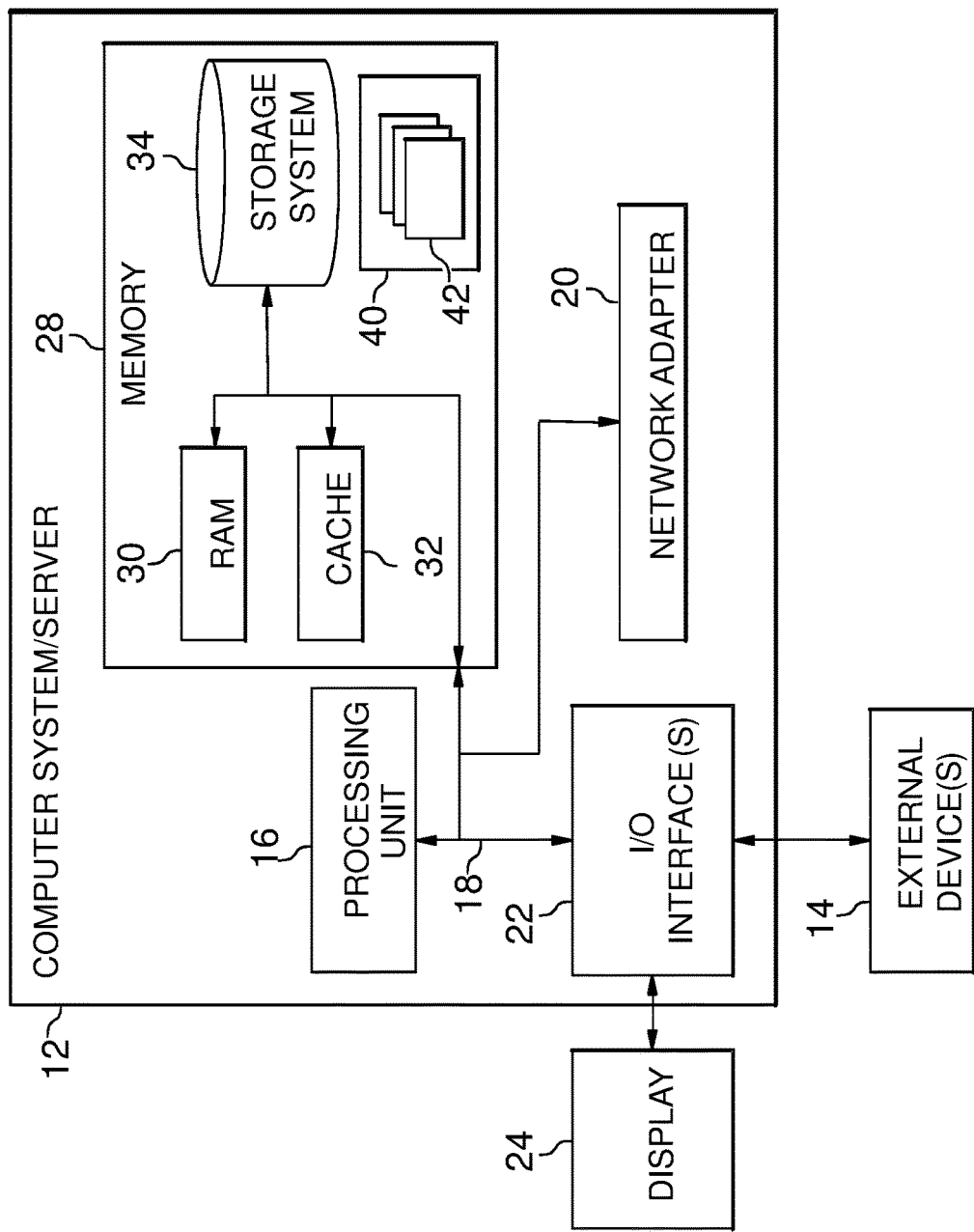
FIG. 1 depicts a cloud computing node according to an embodiment of the present invention.

The present invention generally relates to providing search results to a search query and, more particularly, to providing search results based on natural language classification and confidence information. In accordance with aspects of the present invention, natural language classification (NLC) techniques may be used to determine possible intended subjects of a search query, determine confidence levels associated with each intended subject, and provide search results based on the confidence levels.

As an illustrative example, an NLC server may receive a search query (e.g., from a user) for "How to replace a flat tire," and implement NLC techniques to determine confidence scores identifying a likelihood that the search query related to particular subjects or intentions. In the previous example, the NLC server may determine an example confidence of 75% that the search query related to a "content" search, and a confidence of 25% that the search query related to a "product" search. In embodiments, the search results may be filtered such that a ratio of the search results provided to the user corresponds to the confidence levels returned by the NLC server. In embodiments, the ratio of the search results may match the confidence levels. Continuing with the previous example, the search results may be filtered such that 75% of the search results returned to the user relate to "content" results (e.g., articles relating to tire repair), and 25% of the search results relate to "product" results (e.g., tire products available for purchase). In embodiments, the ratio of the search results may substantially match the confidence levels (e.g., may closely match the confidence levels without exactly matching the confidence levels). Additionally, or alternatively, search results may be ranked based on the confidence scores (e.g., search results with classifications of relatively higher confidence may be ranked higher than search results with classifications of relatively lower confidence). Advantageously, search results provided to the user may be more accurate since the subject or intention of the search is considered when providing the search results. That is, search results may be produced with consideration to the intention behind a search query.

As described herein, NLC techniques for determining confidence scores may be adapted for different hosts (e.g., different parties, groups, organizations, companies, or the like). For example, a host associated with a merchant of products may classify input text differently than the host server associated with a financial service provider. That is, different hosts may host different resources (e.g., web pages, content, etc.) with different classifications. Further, the manner in which phrases or input text is classified (e.g., the relevancy for which resources are tagged by a Cognitive Adapter associated with an NLC server) may differ between different hosts and may be custom tailed for each host. For example, an NLC algorithm may be preconfigured and custom tailored for a host such that search queries received by the host may be classified using the preconfigured and custom tailored NLC algorithm.

Aspects of the present invention may reduce the consumption of computing resources for generating search results based on a search query. For example, since search results are based on the intention behind a search query, more accurate search results are provided to the user, thereby reducing the number of "follow-up" searches and thus, reducing the consumption of computing resources used to search for content. In this way, aspects of the present invention improve the performance of computer-based searching systems. Aspects of the present invention require the use of a computer system for providing search results for content based on a search query.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
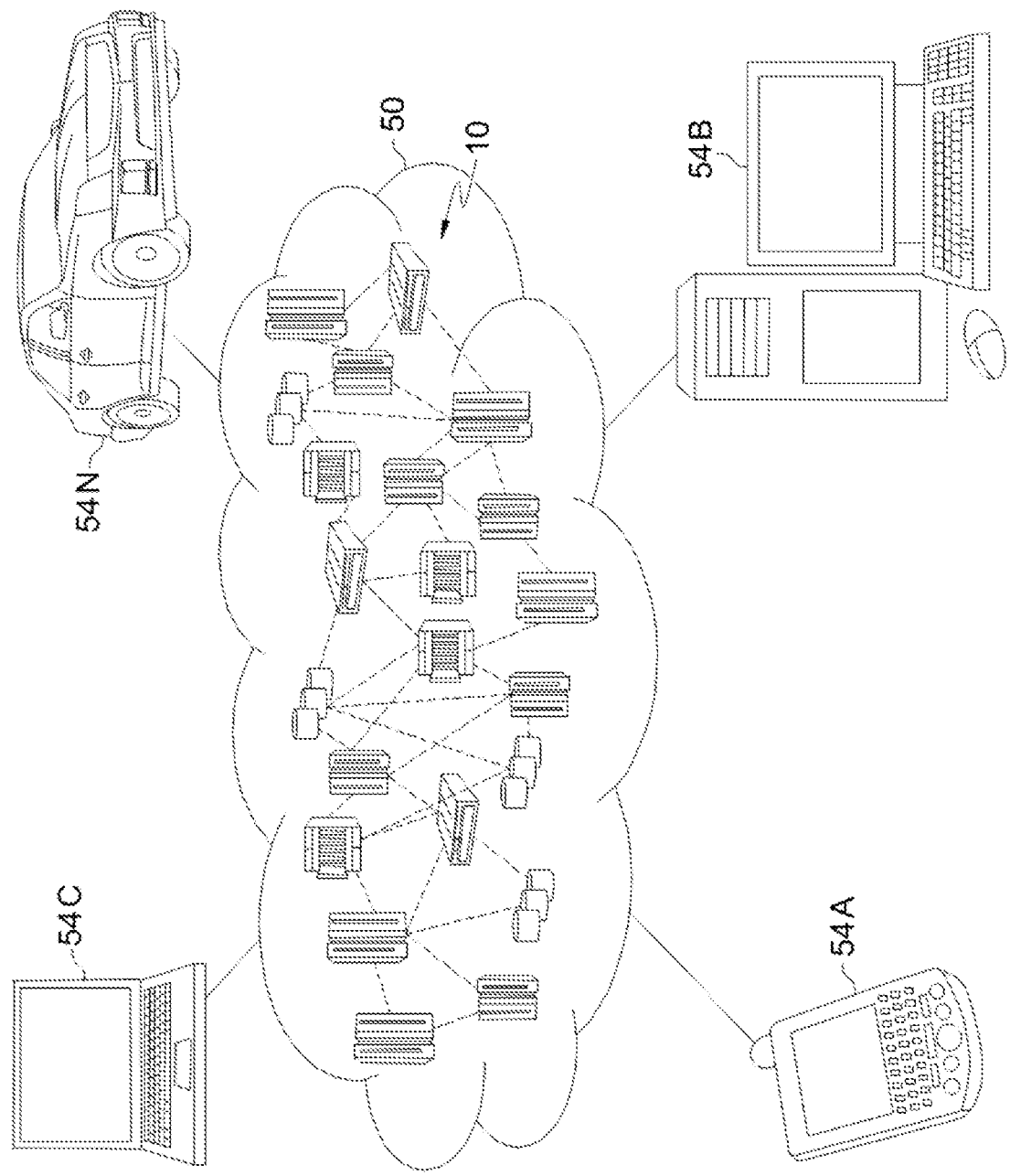
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
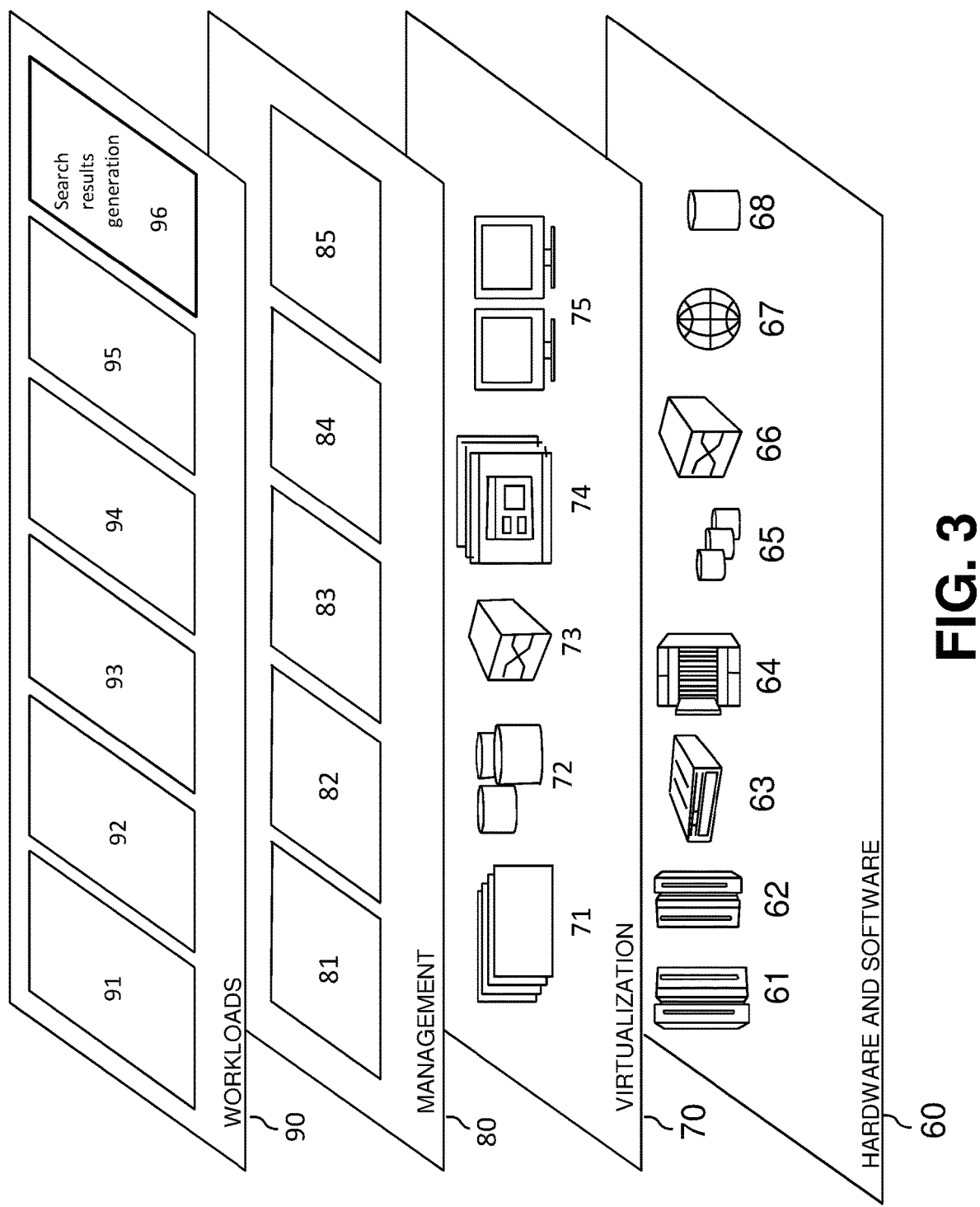
FIG. 3 depicts abstraction model layers according to an embodiment of the present invention.

Referring now to FIG. 3, a set of functional abstraction layers provided by cloud computing environment 50 (FIG.

2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and search results generation 96.

Referring back to FIG. 1, the program/utility 40 may include one or more program modules 42 that generally carry out the functions and/or methodologies of embodiments of the invention as described herein (e.g., such as the functionality provided by search results generation 96). Specifically, the program modules 42 may receive a search query, receive classification an confidence information, generate search results from the search query, and filter and/or rank the search results based on the classification and confidence information. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a host server of FIG. 4.

Figure 4:
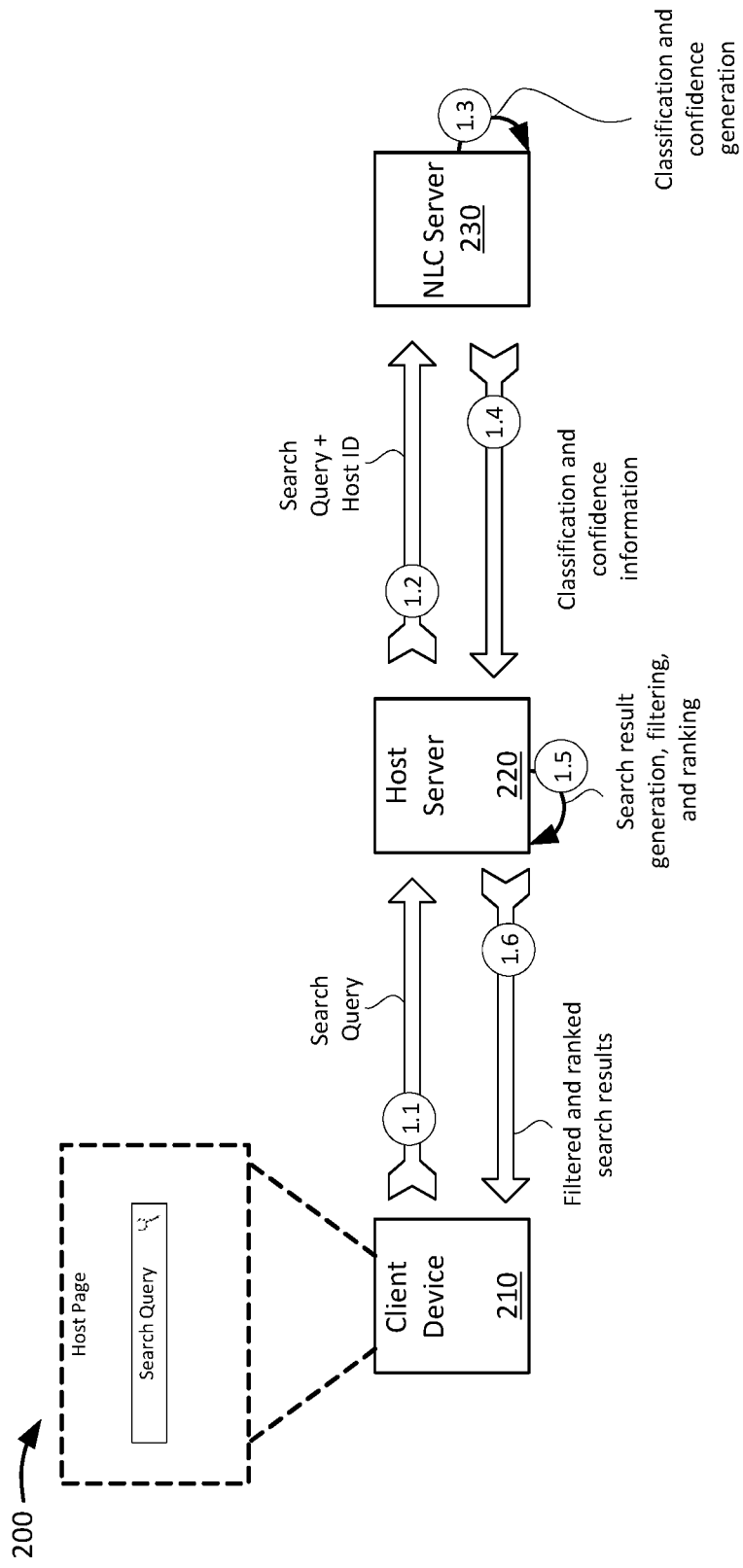
FIG. 4 shows an overview of an example implementation in accordance with aspects of the present invention

FIG. 4 shows an overview of an example implementation in accordance with aspects of the present invention. As shown in FIG. 4, a client device 210 may access a host server 220 which may hose an application, a web page, or the like. As shown in interface 200, the client device 210 may display a page associated with the host server 220. The page may include a toolbar for receiving user input for a search query (e.g., to permit a user accessing the page to search for content hosted by the host server 220).

At step 1.1, the client device 210 may provide a search query to the host server 220 (e.g., based on receiving user input of the search query via the search query toolbar of interface 200). At step 1.2, the host server 220 may provide the search query and an identifier (ID) of the host to an NLC server 230. At step 1.3, the NLC server 230 may generate classification and confidence information based on the search query. For example, as described herein, the NLC server 230 may implement NLC techniques to classify the search query and generate confidence scores indicating the likelihood or confidence that the search relates to particular subjects. As described herein, the NLC sever 230 may generate the classification and confidence information based on a previously configured algorithm custom tailored for the host server 220 (e.g., based on resources provided by the host server 220, such as products, support, content, etc.). For example, the NLC server may generate the classification and confidence information using a custom algorithm associated with the received ID of with the host.

At step 1.4, the NLC server 230 may provide the classification and confidence information to the host server 220. At step 1.5, the host server 220 may generate search results from the search query (e.g., using a combination of any desired search result generation algorithms). Further, the host server 220 may filter and/or rank the search results based on the classification and confidence information. For example, the host server 220 may filter the search results such that a ratio of the search results corresponds to the classification and confidence information. As an example, assume that the classification and confidence information includes a confidence of 75% for classification A and 25% for classification B. Thus, the host server 220 may filter the search results such that 75% of the search results are associated with classification A, and 25% are associated with classification B. Additionally, or alternatively, the host server 220 may rank the search results based on the classification and confidence information. In the previous example, the host server 220 may rank the search results such that the top 75% search results are associated with classification A, and the next 25% search results are associated with classification B. Additionally, or alternatively, the host server 220 may rank the search results in reverse order such that the bottom 75% search results are associated with classification A, and the top 25% search results are associated with classification B. Additionally, or alternatively, the host server 220 may rank the search results an intermixed order. Continuing with the above example, the host server may 220 may rank the top 10% search results associated with classification B, the next 50% search results associated with classification A, the next 15% search results associated with classification B, and the final 25% search results associated with classification C. In embodiments, an administrator of the host server 220 may define a manner in which to rank the search results. In embodiments, the host server 220 may not rank the search results based on the classification and confidence information and may instead rank the search results using a different ranking algorithm exclusive of the classification and confidence information. At step 1.6, the host server 220 may provide the filtered and/or ranked search results to the client device 210 (e.g., for display by the client device 210 in a search results page).

Figure 5:
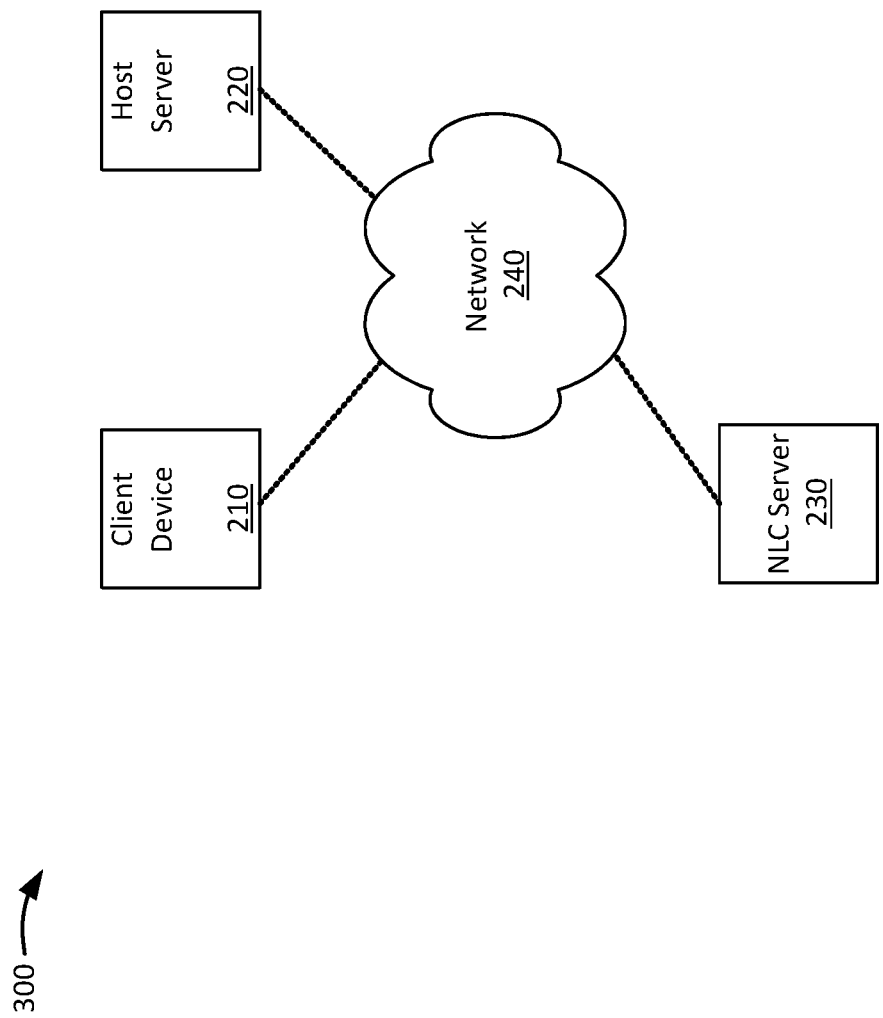
FIG. 5 shows an example environment in accordance with aspects of the present invention.

FIG. 5 shows an example environment in accordance with aspects of the present invention. As shown in FIG. 5, environment 300 may include a client device 210, a host server 220, a NLC server 230, and a network 240. In embodiments, one or more components in environment 300 may correspond to one or more components in the cloud computing environment of FIG. 2.

The client device 210 may include a device capable of communicating via a network, such as the network 240. For example, the client device 210 may correspond to a mobile communication device (e.g., a smart phone or a personal digital assistant (PDA)), a portable computer device (e.g., a laptop or a tablet computer), or another type of device. In some embodiments, a user may use the client device 210 to access the host server 220 and search for content hosted by the host server 220 via a search query toolbar implemented by the host server 220.

The host server 220 may include one or more computing and/or server devices that host content/web pages associated with a host (e.g., a party, group, company, organization, or the like). In embodiments, a single host server 220 may host content/web pages associated with multiple different hosts. The host server 220 may implement a search function such that resources associated with a host may be searched by a user. The host server 220 may communicate with the NLC server 230 to obtain classification and confidence information to augment search algorithms and provide search results to the user based on the classification and confidence information.

The NLC server 230 may include one or more computing and/or server devices that may implement NLC techniques to determine classification and confidence information for search queries received from the host server 220. As described herein, the NLC server 230 may implement different custom NLC algorithms for different hosts based on an ID received as part of the search query from the host server 220. For example, as part of an initial set up phase between a host and the NLC server 230, the NLC server 230 may receive information regarding resources provided by the host (e.g., products, support information, content, etc.). The resources may be tagged for relevancy by a Cognitive Appender implemented by the NLC server 230. Additionally, or alternatively, the NLC server 230 may store a customized index of words, phrases, etc. for each host, and may store information indicating how the words, phrases, etc. may be classified. For example, a customized index may map words, phrases, etc. to candidate classifications, and the NLC server 230 may determine classification and confidence information for a search query using the customized index. The NLC server 230 may apply natural language classification to a search query on behalf of the host server 220 using a customized algorithm (e.g., as identified by a host ID) that is mapped to a customized index.

The network 240 may include network nodes, such as network nodes 10 of FIG. 2. Additionally, or alternatively, the network 240 may include one or more wired and/or wireless networks. For example, the network 240 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 240 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 300 is not limited to what is shown in FIG. 5. In practice, the environment 300 may include additional devices and/or networks; fewer devices and/or networks; different devices and/or networks; or differently arranged devices and/or networks than illustrated in FIG. 5. Also, in some implementations, one or more of the devices of the environment 300 may perform one or more functions described as being performed by another one or more of the devices of the environment 300. In particular, the host server 220 may perform the processes described as being performed by the NLC server 230. For example, the host server 220 may include the functionality of the NLC server 230 to generate classification and confidence information for producing more relevant search results with consideration to the intentions behind the search result. Devices of the environment 300 may interconnect via wired connections, wireless connections, or a combination of wired and wireless connections.

Figure 6:
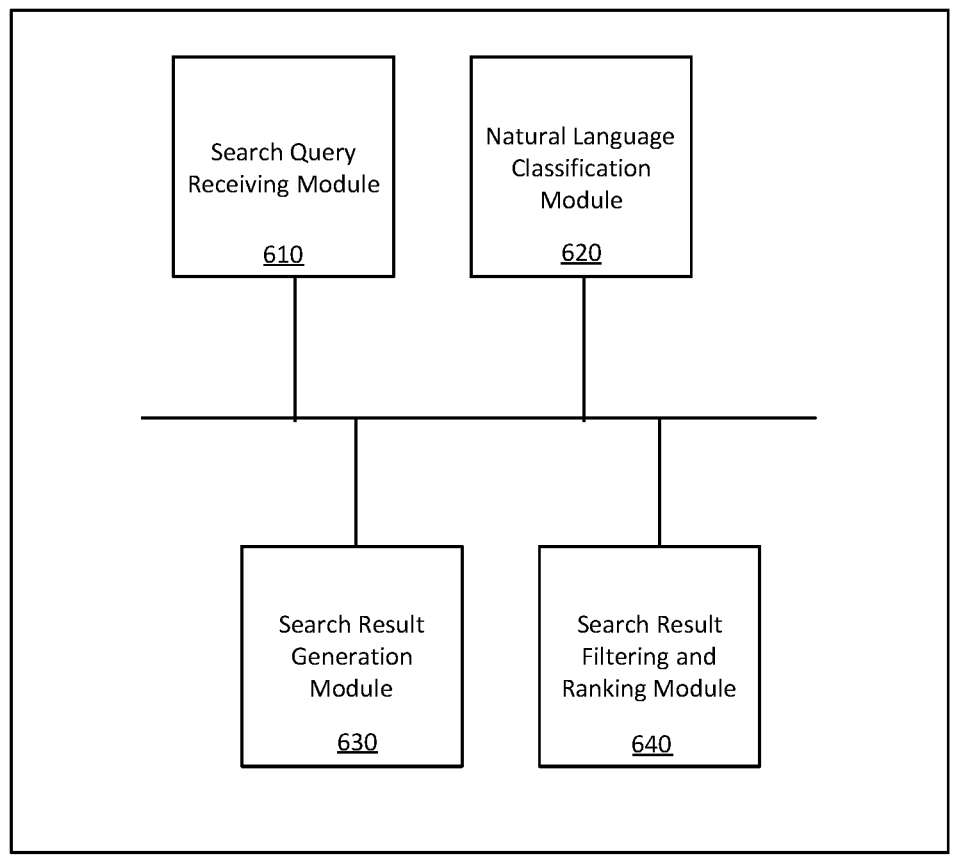
FIG. 6 shows a block diagram of example components of a host server in accordance with aspects of the present invention.

FIG. 6 shows a block diagram of example components of a host server 220 in accordance with aspects of the present invention. As shown in FIG. 6, the host server 220 may include a search query receiving module 610, a natural language classification module 620, a search result generation module 630, and a search result filtering and ranking module 640. In embodiments, the host server 220 may include additional or fewer components than those shown in FIG. 6. In embodiments, separate components may be integrated into a single computing component or module. Additionally, or alternatively, a single component may be implemented as multiple computing components or modules.

The search query receiving module 610 may include a program module (e.g., program module 42 of FIG. 1) that receives a search query (e.g., from client device 210). In embodiments, the search query receiving module 610 may receive a search query inputted by a user via a search toolbar implemented within a web page, application, or the like.

The natural language classification module 620 may include a program module (e.g., program module 42 of FIG. 1) that may apply natural language classification techniques/algorithms to classify the search query. In embodiments, the natural language classification module 620 may apply the natural language classification techniques by providing the search query to the NLC server 230 to direct the NLC server 230 to apply the natural language classification technique on behalf of the natural language classification module 620. In embodiments, the natural language classification module 620 may also provide an ID of the host associated with the web page or application from which the search query is received (e.g., to direct the NLC server 230 to apply a custom natural language classification algorithm to the search query). The natural language classification module 620 may receive classification and confidence information from the NLC server 230. Alternatively, the natural language classification module 620 may itself apply natural language classification techniques without involving the NLC server 230.

The search result generation module 630 may include a program module (e.g., program module 42 of FIG. 1) that generates search results based on the search query. In embodiments, the search result generation module 630 may implement any search algorithm or combination thereof as configured by an administrator. As described herein, the search result generation module 630 may generate an initial set of search results which may be filtered and/or ranked.

The search result filtering and ranking module 640 may include a program module (e.g., program module 42 of FIG. 1) that filters and/or ranks the search results based on the received classification and confidence information. For example, the search result filtering and ranking module 640 may filter the search results generated by the search result generation module 630 such that a ratio of the search results is based at least partially on the classification and confidence information. Additionally, or alternatively, the search result filtering and ranking module 640 may rank the search results generated by the search result generation module 630 based on the classification and confidence information.

In embodiments, the functions of search result generation module 630 may be performed by search result filtering and ranking module 640. For example, the search result filtering and ranking module 640 may generate the search results based on the classification and confidence information such that a ratio of the search results correspond to the classification and confidence information. That is, the search result filtering and ranking module 640 may generate a single set of search results without filtering out search results from a previous set of search results.

Figure 7:
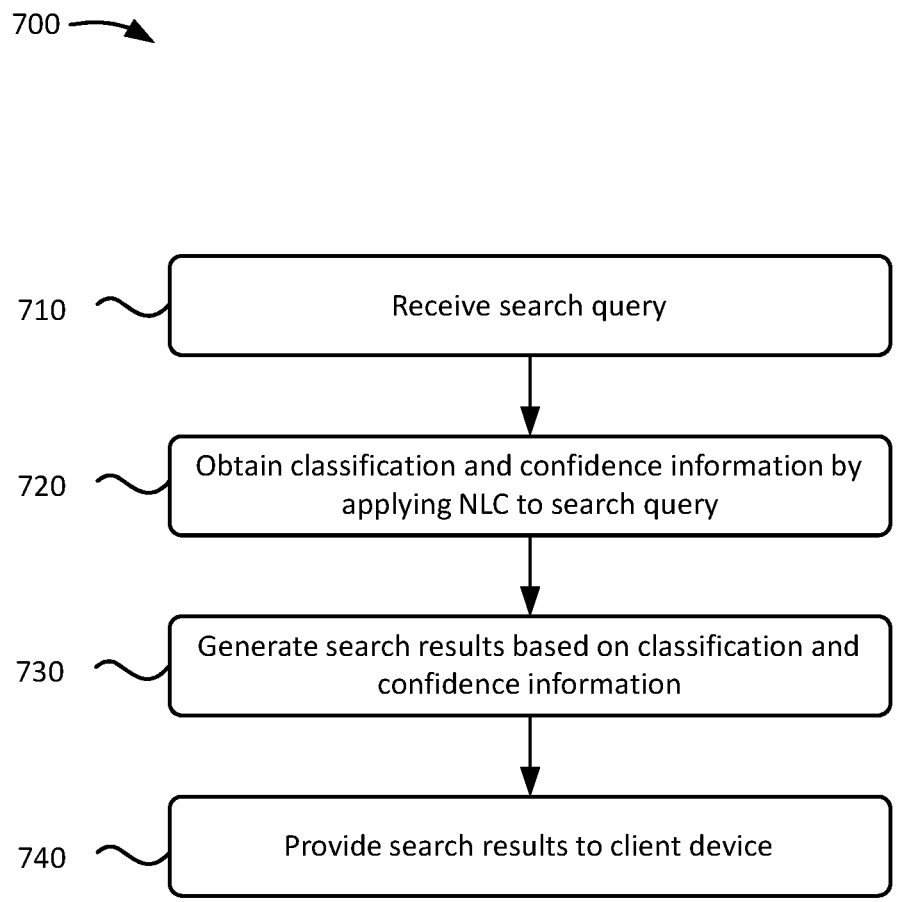
FIG. 7 shows an example flowchart for providing search results based on natural language classification and confidence information in accordance with aspects of the present invention.

FIG. 7 shows an example flowchart for providing search results based on natural language classification and confidence information in accordance with aspects of the present invention. The steps of FIG. 7 may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention.

As shown in FIG. 7, process 700 may include receiving a search query (step 710). For example, as discussed above with respect to the search query receiving module 610, the host server 220 may receive a search query from a client device 210 inputted by a user via a search toolbar implemented within a web page, application, or the like.

Process 700 may also include obtaining classification and confidence information by applying NLC techniques to the search query (step 720). For example, as described above with respect to the natural language classification module 620, the host server 220 may apply the natural language classification techniques by providing the search query to the NLC server 230. In embodiments, the host server 220 may also provide an ID of the host associated with the web page or application from which the search query is received. The host server 220 may receive classification and confidence information from the NLC server 230. Alternatively, the natural language classification module 620 may itself apply natural language classification techniques without involving the NLC server 230.

Process 700 may further include generating search results based on the classification and confidence information (step 730). For example, as described above with respect to the search result generation module 630 and the search result filtering and ranking module 640, may implement any search algorithm or combination thereof as configured by an administrator. As described herein, the host server 220 may generate an initial set of search results which may be filtered and/or ranked. The host server 220 may filter the initial search such that a ratio of the search results is based at least partially on the classification and confidence information. Additionally, or alternatively, the search result filtering and ranking module 640 may rank the search results based on the classification and confidence information. In embodiments, the search result filtering and ranking module 640 may generate a single set of search results without filtering out search results from a previous set of search results.

Process 700 may further include providing the search results to the client device (step 740). For example, the host server 220 may provide the search results to the client device 210. In this way, the user who originally provided the search query may receive more relevant search results that more closely match the user's intentions behind the search query.

Figure 8:
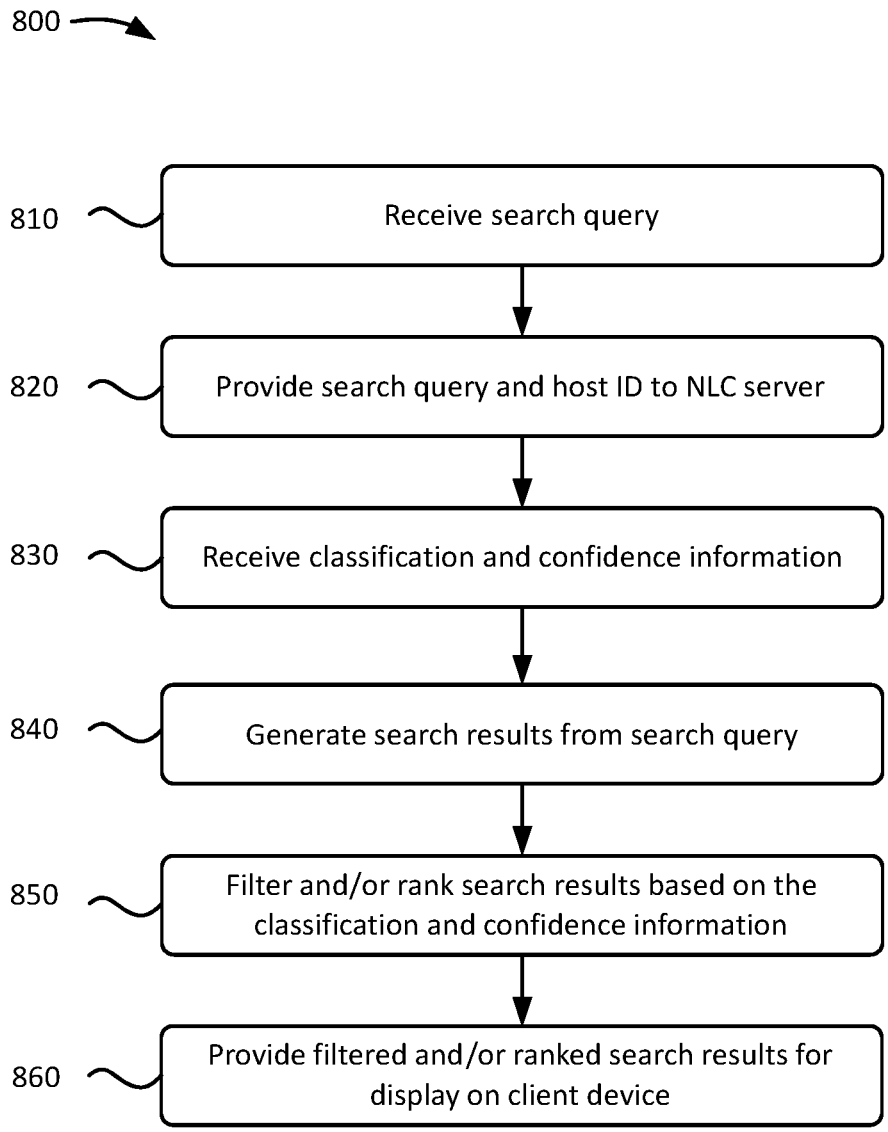
FIG. 8 shows an example flowchart for providing search results based on natural language classification and confidence information in accordance with aspects of the present invention.

FIG. 8 shows an example flowchart for providing search results based on natural language classification and confidence information in accordance with aspects of the present invention. The steps of FIG. 8 may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention.

As shown in FIG. 8, process 800 may include receiving a search query (step 810). For example, as discussed above with respect to the search query receiving module 610, the host server 220 may receive a search query inputted by a user via a search toolbar implemented within a web page, application, or the like.

Process 800 may further include providing the search query and a host ID to the NLC server 230 (step 820). For example, as described above respect to the natural language classification module 620, the host server 220 may provide the search query to the NLC server 230. In embodiments, the host server 220 may also provide an ID of the host associated with the web page or application from which the search query is received.

Process 800 may also include receiving classification and confidence information (step 830). For example, as described above respect to the natural language classification module 620, the host server 220 may receive the classification and confidence information from the NLC server 230. In embodiments, the NLC server 230 may receive the search query and the host ID and use NLC techniques to generate the classification and confidence information using a custom tailored NLC algorithm associated with the host ID. For example, the custom tailored NLC algorithm may include a custom index that maps words, phrases, characters, etc. to candidate classifications.

Process 800 may further include generating search results from the search query (step 840). For example, as described above respect to the search result generation module 630, the host server 220 may implement any search algorithm or combination thereof as configured by an administrator. As described herein, the host server 220 may generate an initial set of search results which may be filtered and/or ranked.

Process 800 may also include filtering and/or ranking search results based on the classification and confidence information (step 850). For example, as described above respect to the search result filtering and ranking module 640, the host server 220 may filters and/or ranks the search results based on the received classification and confidence information. For example, the host server 220 may filter the search results generated by the search result filtering and ranking module 640 such that a ratio of the search results is based at least partially on the classification and confidence information. Additionally, or alternatively, the host server 220 may rank the search results generated by the search result generation module 630 based on the classification and confidence information.

Process 800 may further include providing the filtered and/or ranked search results for display on the client device (step 860). For example, the host server 220 may provide the filtered and/or ranked search results for display on the client device 210. In this way, the user who originally provided the search query may receive more relevant search results that more closely match the user's intentions behind the search query.

In embodiments, one or more steps of FIG. 8 may be omitted and/or combined. For example, step 840 may be combined with steps 850 and 860 such that a single set of search results are generated based on the classification and confidence information such that a ratio of the search results correspond to the classification and confidence information. That is, a single set of search results may be generated without filtering out search results from a previous set of search results.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, by a computing device, a search query from a client device;
obtaining, by the computing device, classification and confidence information by applying natural language classification to the search query;
generating, by the computing device, search results based on the classification and confidence information; and
providing, by the computing device, the search results to the client device,
wherein the obtaining the classification and confidence information comprises providing the search query to a natural language classification server with a host identifier to cause the natural language classification server to apply a custom natural language classification algorithm, associated with the host identifier, that has been preconfigured for a host server, based on resources previously provided by the host server to the natural language classification server, to direct the natural language classification server to apply the natural language classification to the search query.

2. The method of claim 1, wherein the classification and confidence information indicates a plurality of classifications associated with the search query and respective confidence levels associated with each of the plurality of classifications.

3. The method of claim 1, wherein the search results are ranked based on the classification and confidence information.

4. The method of claim 2, wherein the generating comprises filtering a total number of documents included in the search results such that the ratio of the search results associated with each classification to the total number of documents included in the search results matches the respective confidence levels.

5. The method of claim 2, the respective confidence levels are obtained independently of user instruction defining the respective confidence levels.

6. The method of claim 1, wherein the custom natural language classification algorithm includes a custom index of words or phrases that map to candidate classifications.

7. The method of claim 1, further comprising, generating an initial set of search results based on the search query, wherein generating the search results based on the classification and confidence information comprises filtering the initial set of search results based on the classification and confidence information.

8. The method of claim 1, wherein the classification information relates to a subject or intent of the search query and the confidence information relates to a likelihood that the search query related to the subject or intent.

9. The method of claim 1, wherein the search query is received via a search toolbar on a web page or application associated with a host or service provider.

10. The method of claim 1, further comprising receiving the classification and confidence information from the natural language classification server.

11. The method of claim 1, wherein a service provider at least one of creates, maintains, deploys and supports the computing device.

12. The method of claim 1, wherein steps of claim 1 are provided by a service provider on a subscription, advertising, and/or fee basis.

13. The method of claim 1, wherein the computing device includes software provided as a service in a cloud environment.

14. The method of claim 1, further comprising deploying a system for generating the search results based on the classification and confidence information, comprising providing a computer infrastructure operable to perform the steps of claim 1.

15. The method of claim 1, wherein the resources previously provided by the host server to the natural language classification server include at least one selected from a group consisting of: products; support; and content.

16. The method of claim 15, wherein the resources previously provided by the host server are tagged for relevancy by a Cognitive Appender implemented by the natural language classification server.

17. The method of claim 16, further comprising displaying the search results on the client device.

18. The method of claim 17, wherein the displayed search results are displayed in a search results page.

19. The method of claim 18, further comprising filtering the search results.

20. The method of claim 19, wherein the filtering the search results filters the search results such that a ratio of the search results is based at least partially on the classification and confidence information.

* * * * *